US008000953B2

(12) United States Patent
Bell, Jr. et al.

(10) Patent No.: US 8,000,953 B2
(45) Date of Patent: Aug. 16, 2011

(54) AUGMENTING OF AUTOMATED CLUSTERING-BASED TRACE SAMPLING METHODS BY USER-DIRECTED PHASE DETECTION

(75) Inventors: Robert H. Bell, Jr., Austin, TX (US); Wen-Tzer Thomas Chen, Austin, TX (US); Pattabi R. Seshadri, Austin, TX (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/842,337

(22) Filed: Aug. 21, 2007

(65) Prior Publication Data
US 2009/0055153 A1 Feb. 26, 2009

(51) Int. Cl.
*G06F 9/45* (2006.01)
(52) U.S. Cl. ........................................................ 703/22
(58) Field of Classification Search .................. 703/14, 703/22; 714/45; 717/128, 130, 134, 135; 716/4
See application file for complete search history.

(56) References Cited

OTHER PUBLICATIONS

G. Hamerly et al., "Simpoint 3.0: Faster and More Flexible Program Analysis," J. Instruction-Level Parallelism, vol. 7, Sep. 2005; http://www.jilp.org/vol7. 28 pages.*
Wu, C. E., Bolmarcich, A., Snir, M., Wootton, D., Parpia, F., Chan, A., Lusk, E., and Gropp, W. 2000. From trace generation to visualization: a performance framework for distributed parallel systems. In Proceedings of the 2000 ACM/IEEE Conference on Supercomputing (Cdrom) (Dallas, Texas, United States, Nov. 4 -10, 2000, 18 pages.*

* cited by examiner

*Primary Examiner* — Paul L Rodriguez
*Assistant Examiner* — Luke Osborne
(74) *Attorney, Agent, or Firm* — Yee & Associates, P.C.; Matthew W. Baca

(57) ABSTRACT

Computer implemented method, system, and computer usable program code for simulating processor operation in a data processing system. An instruction trace is generated, wherein the instruction trace includes markers specified by a user for identifying interval boundaries for at least one interval of the instruction trace. The instruction trace is divided into a plurality of intervals in consideration of the markers, and the plurality of intervals are formed into a plurality of interval clusters, wherein each interval cluster represents one phase of execution of the instruction trace. At least one interval from each of the plurality of interval clusters is selected as a trace sample to provide a plurality of trace samples, wherein each selected interval is of at least a minimum size, a simulation is performed using the plurality of trace samples, and a result of the simulation is provided to the user.

17 Claims, 9 Drawing Sheets

```
CODE
 620
   ↓
  fA()
  {
    ...
    fB();
    ...
    insertMarkerS;
    fC();
    insertMarkerE;
  }
  fC()
  {
    ...
    fB();
    ...
  }
  fB()
  {
  }
    ...
    insertMarkerB;
    ...
  }
```
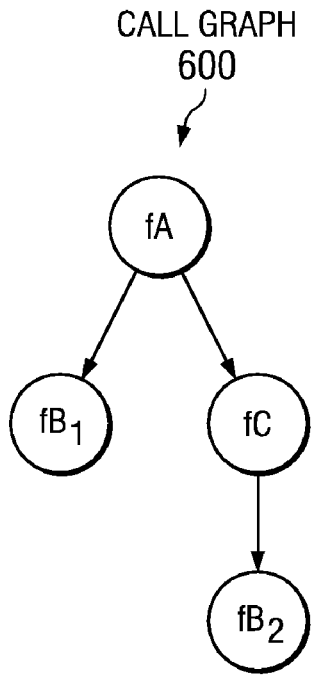
CALL GRAPH 600
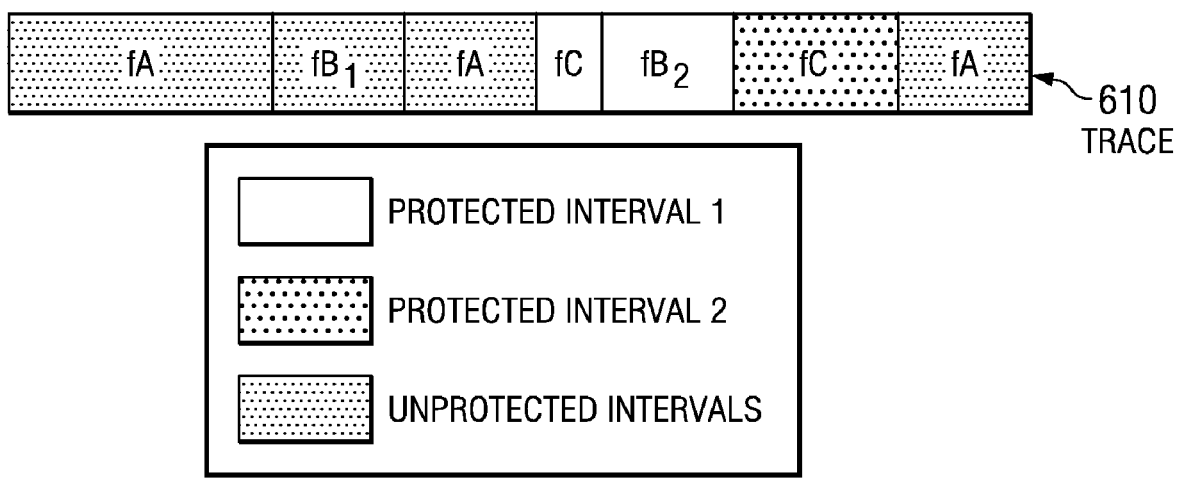
*FIG. 6*

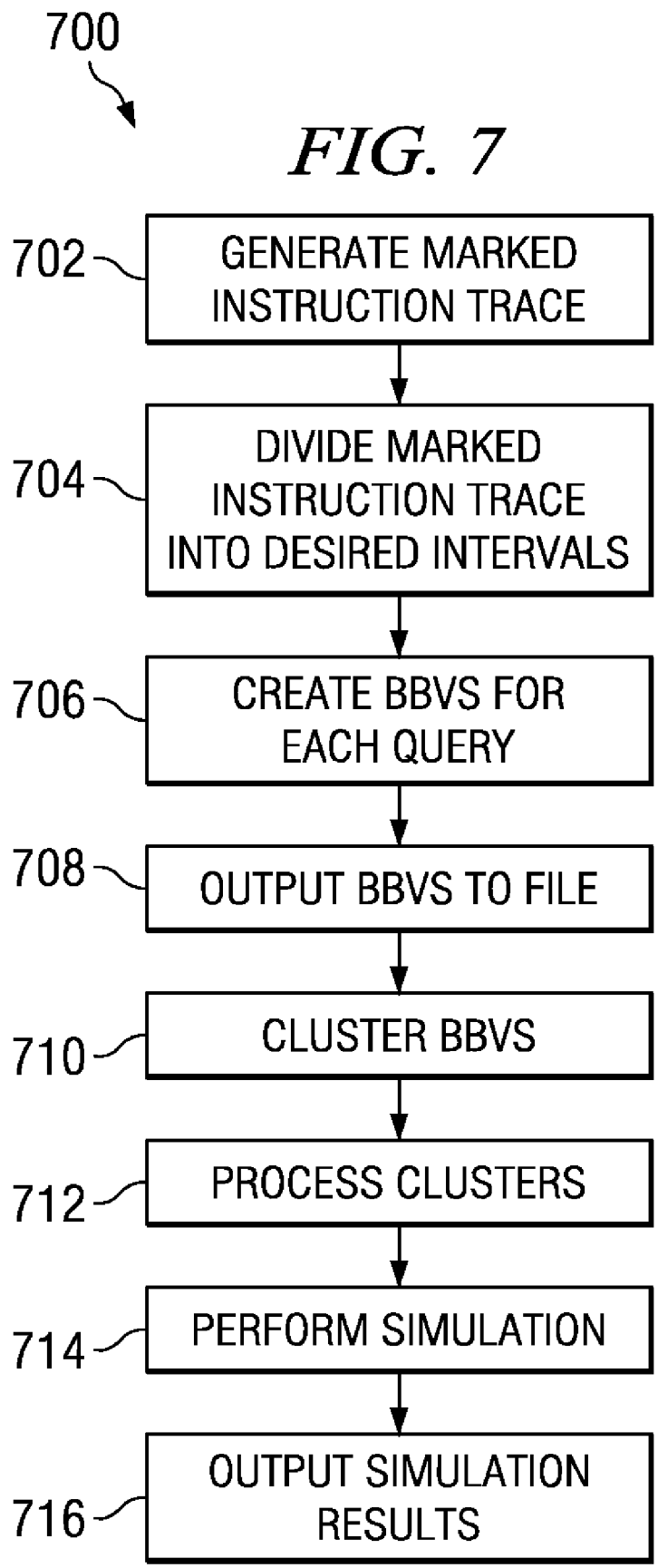

AUGMENTING OF AUTOMATED CLUSTERING-BASED TRACE SAMPLING METHODS BY USER-DIRECTED PHASE DETECTION

BACKGROUND OF THE INVENTION

1. Field of the Invention

The present invention relates generally to the data processing field and, more particularly, to a computer implemented method, system and computer usable program code for simulating processor operation in a data processing system.

2. Description of the Related Art

Trace sampling is motivated by the need for an instruction trace that is short enough to complete on a cycle-accurate processor model in a reasonable period of time, which is often not possible if a full trace is run. For example, many programs used for benchmarking and performance projections have pathlengths of hundreds of billions to trillions of instructions or more. Given that a cycle-accurate processor model may run at about 10K instructions per second, a 1T instruction trace would require over three years to complete. Accordingly, it is necessary to use trace samples (or, for execution-driven simulators, checkpoints) for cycle-accurate simulation.

Using trace samples in lieu of a full trace for a simulation, however, presents the problem of representativeness—that is, the trace samples may not have the same performance characteristics as the full trace. If a trace sample is not representative within a small margin of error (in practice, about five percent is the maximum tolerable error, and a one percent error is a more ideal limit), the trace samples will not be useful for making performance predictions and design decisions. Therefore, it is necessary to have an effective mechanism for determining which parts of a full trace should be used as trace samples.

Considerable effort has been directed to creating and improving mechanisms for measuring the representativeness of trace samples and for taking representative trace samples. One known metric for measuring the representativeness of trace samples is called "R-Metric". This metric has been used to measure the representativeness of trace samples at uniform intervals. A limitation of R-Metric, however, is that although it measures the representativeness of a given trace sample, it does not provide a mechanism for determining the most representative trace sample out of a set of all possible trace samples, unless all possible samples are taken and their R-Metrics are compared, which is impossible since the set of possible samples is intractably large. Accordingly, a trial-and-error approach is required in which a sample is taken, its R-Metric is measured, and, if the R-Metric is not below a user-determined maximum, another sample is taken and the process is repeated until a sample with a below-maximum R-Metric is found, which may not happen in a reasonable amount of time, and may never happen.

Two newer sampling mechanisms, called "SMARTS" and "TurboSMARTS", are mechanisms based on statistical sampling in which thousands of small periodic samples of a trace are taken, and then either run serially with the simulator switched to a faster functional mode for the non-sampled instructions in order to warm the machine state (SMARTS), or run in parallel with checkpoints to create warmed machine states (TurboSMARTS).

The SMARTS and TurboSMARTS mechanisms result in very representative samples (0.64 percent average CPI error on a known system), but have a disadvantage in speed.

In particular, SMARTS requires running all of the non-sampled instructions through a functional simulator to warm machine state, which could require weeks of simulation for runs of longer benchmarks. TurboSMARTS allows for a much faster simulation by breaking each sample into thousands of small pieces and running them in parallel, however, it is still necessary to create checkpoint files once for each performance binary, which may require weeks for each benchmark. These approaches may be satisfactory for research purposes; however, in a production/development environment, where very tight schedules must be adhered to and where compiler tuning occurs in parallel with hardware development, resulting in new benchmark binaries every week, a trace sampling mechanism that will allow a new trace sample to be created in a number of days is preferred.

A promising automated clustering-based method for trace sample selection that has recently been proposed is known as "SimPoint." SimPoint works by clustering, or grouping, intervals of a trace based on the code profile of each interval, which is represented by a basic block vector (BBV) for each interval. By clustering intervals by BBV, SimPoint aims to sort intervals by their code profiles into phases, where each cluster represents one phase of execution. The assumption here is that there is a strong correlation between the code executed during an interval and the performance characteristics of that interval. The trace sample generated by SimPoint comprises one interval from each cluster, with the goal being that these intervals will represent all the different phases of execution; and thus (if each interval's CPI is weighted by the size of its cluster) constitute a representative trace sample for a simulation.

SimPoint-style methods for trace sample selection typically break a dynamic instruction trace into intervals of uniform length and select a fewest number of intervals that together exhibit performance similar to the full trace. SimPoint has been shown to produce trace samples with a reasonably small error in CPI compared to full traces, for example, about three percent.

A three percent error, however, is not insignificant and there is room for improvement in SimPoint-style trace sample selection methods. A central disadvantage of SimPoint-style methods is that a trace is divided into intervals along arbitrary boundaries, which may or may not correspond to boundaries between actual phases of execution. A phase of execution is a segment of a dynamic instruction trace that exhibits unique and stable performance characteristics (principally CPI, but also cache miss rates, branch misprediction rates, etc.). A change in dynamic performance characteristics corresponds to the end of one phase and the beginning of another, i.e., a "phase boundary." If SimPoint interval boundaries are not aligned with phase boundaries, phases will be divided among multiple intervals and mixed with instructions from other phases, thus eroding or distorting the difference between intervals as seen by a clustering algorithm. Thus, with fixed-length intervals, a clustering algorithm may not result in clusters that correspond to phases, and this can result in trace samples that are less than optimally representative.

In order to address the problem of unaligned interval boundaries, a variable-length interval version of SimPoint has been proposed that automatically creates intervals of variable length using a method derived from language processing algorithms to determine the length of intervals based on patterns of loop, call, and return events. However, since with this method variable length interval boundaries are determined solely by events in the instruction stream, this method, like SimPoint with fixed-length intervals, assumes a strong correlation between code profile and phase behavior.

Also, with this variable-length interval version of SimPoint, interval boundaries can only occur on calls, returns, and at the beginning or end of a loop; however, phase boundaries may occur in between these events. Yet further, the method may result in an average CPI error of about two-percent, but only if the total sample is over 4B instructions in length. For a modeling environment such as one in which each workload needs to be represented as a single 100M-instruction serial trace, which is the case in some processor modeling environments, a 4B-instruction trace is intractable because it takes too long to simulate.

There is, accordingly, a need for a mechanism for selecting highly representative trace samples in a clustering-based trace sample selection mechanism used for selecting trace samples for simulating processor operation in a data processing system.

SUMMARY OF THE INVENTION

Exemplary embodiments provide a computer implemented method, system, and computer usable program code for simulating processor operation in a data processing system. An instruction trace is generated, wherein the instruction trace includes markers specified by a user for identifying interval boundaries for at least one interval of the instruction trace. The instruction trace is divided into a plurality of intervals in consideration of the markers, and the plurality of intervals are formed into a plurality of interval clusters, wherein each interval cluster represents one phase of execution of the instruction trace. At least one interval from each of the plurality of interval clusters is selected as a trace sample to provide a plurality of trace samples, wherein each selected interval is of at least a minimum size, a simulation is performed using the plurality of trace samples, and a result of the simulation is provided to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIGS. 4, 5, and 6 are call graphs and traces that illustrate the manner in which placement of markers affects interval boundaries of a trace according to exemplary embodiments;

FIG. 7 is a flowchart that illustrates a method for simulating processor operation according to an exemplary embodiment.

DETAILED DESCRIPTION OF THE PREFERRED EMBODIMENT

Figure 1:
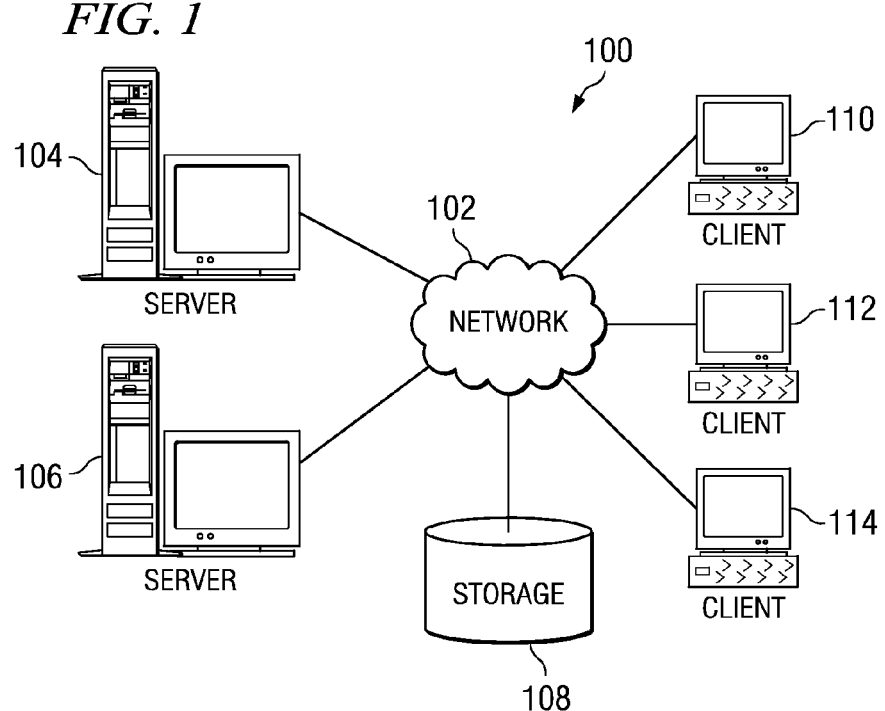
FIG. 1 depicts a pictorial representation of a network of data processing systems in which exemplary embodiments may be implemented.

With reference now to the figures and in particular with reference to FIG. 1, a pictorial representation of a data processing system is shown in which exemplary embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or an IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
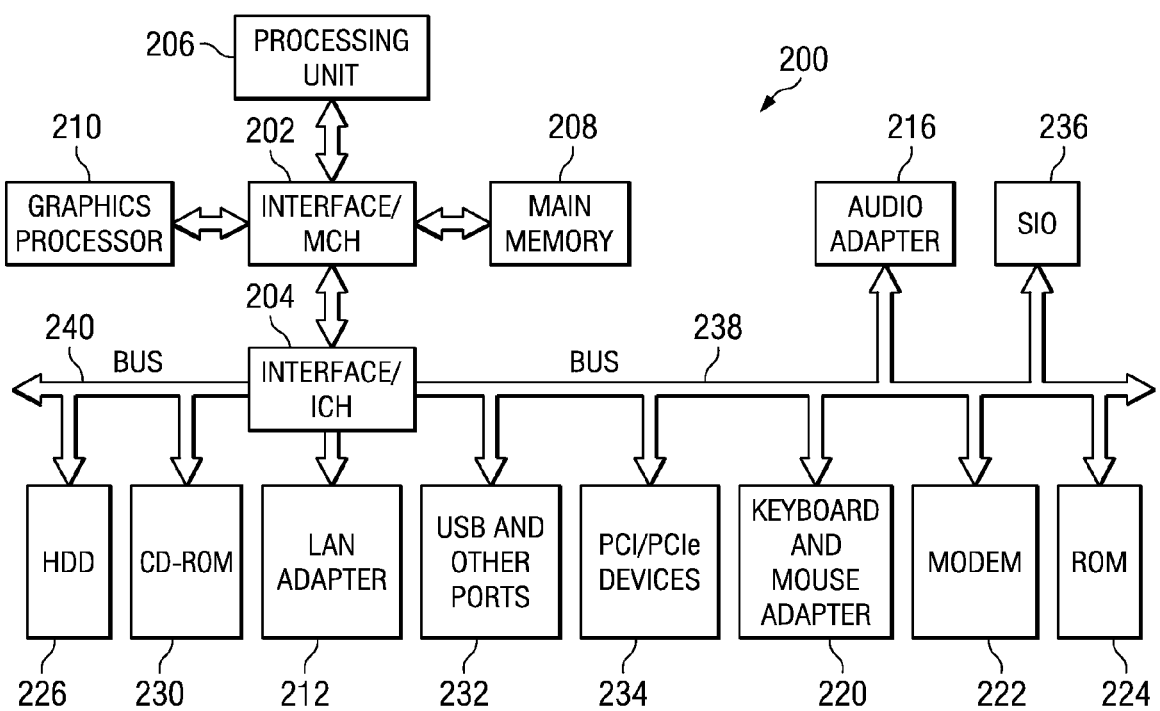
FIG. 2 depicts a data processing system in which exemplary embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

As indicated previously, clustering-based mechanisms for selecting trace samples, for example SimPoint trace sample selection mechanisms, have been shown to be promising as a mechanism for selecting representative trace samples for simulating processor operation. However, these mechanisms still result in average errors of about two or three percent due, in part, to the fact that intervals into which an instruction trace is divided, whether they be of fixed length or of variable length, are determined solely by events in the instruction stream.

Exemplary embodiments provide a computer implemented method, system, and computer usable program code for trace-driven cycle-accurate processor simulation. More particularly, exemplary embodiments provide a clustering-based trace sample selection mechanism that provides highly representative trace samples for processor simulation by allowing a user to apply his/her intimate knowledge of a program's phase behavior to the trace sample selection process.

Exemplary embodiments recognize that an intelligent user who has intimate knowledge of a program's phase behavior can provide important information that will assist a clustering-based algorithm in selecting the most representative trace samples for a simulation. In particular, many development groups spend considerable time and resources in understanding the phase behavior of programs, which is important not only for performance projections, but also for debugging and compiler optimizations. SimPoint-style trace sample selection mechanisms, however, are fully automated and there is no easy way for a user to influence the process by which SimPoint chooses intervals for execution. Furthermore, a phase identification process that is solely user-directed will also not always be optimal, because SimPoint-style methods might be able to identify phases of execution that an intelligent user may not be aware of.

According to exemplary embodiments, problems inherent in automatically-generated interval boundaries are addressed by allowing a user to apply his/her knowledge of a program's phase behavior to trace sampling. More particularly, according to exemplary embodiments, a user is enabled to instrument the source code of an application to be traced in order to preserve the contiguity of known phases, while, at the same time, still allowing sections of the trace whose phase behavior is unknown to be divided into automatically-determined intervals (whether of fixed or variable length). These intervals can then be fed into a SimPoint-style clustering algorithm to find the most representative intervals. In other words, exemplary embodiments allow a user to identify known phases of execution (in source code, without having to edit a large trace), and allow the clustering tool to find the rest of the phases. By adding this level of control and flexibility to Sim-Point-style methods, more representative trace samples can be achieved than are currently possible, especially for applications whose phase behavior is well or, at least, partially understood.

Figure 3:
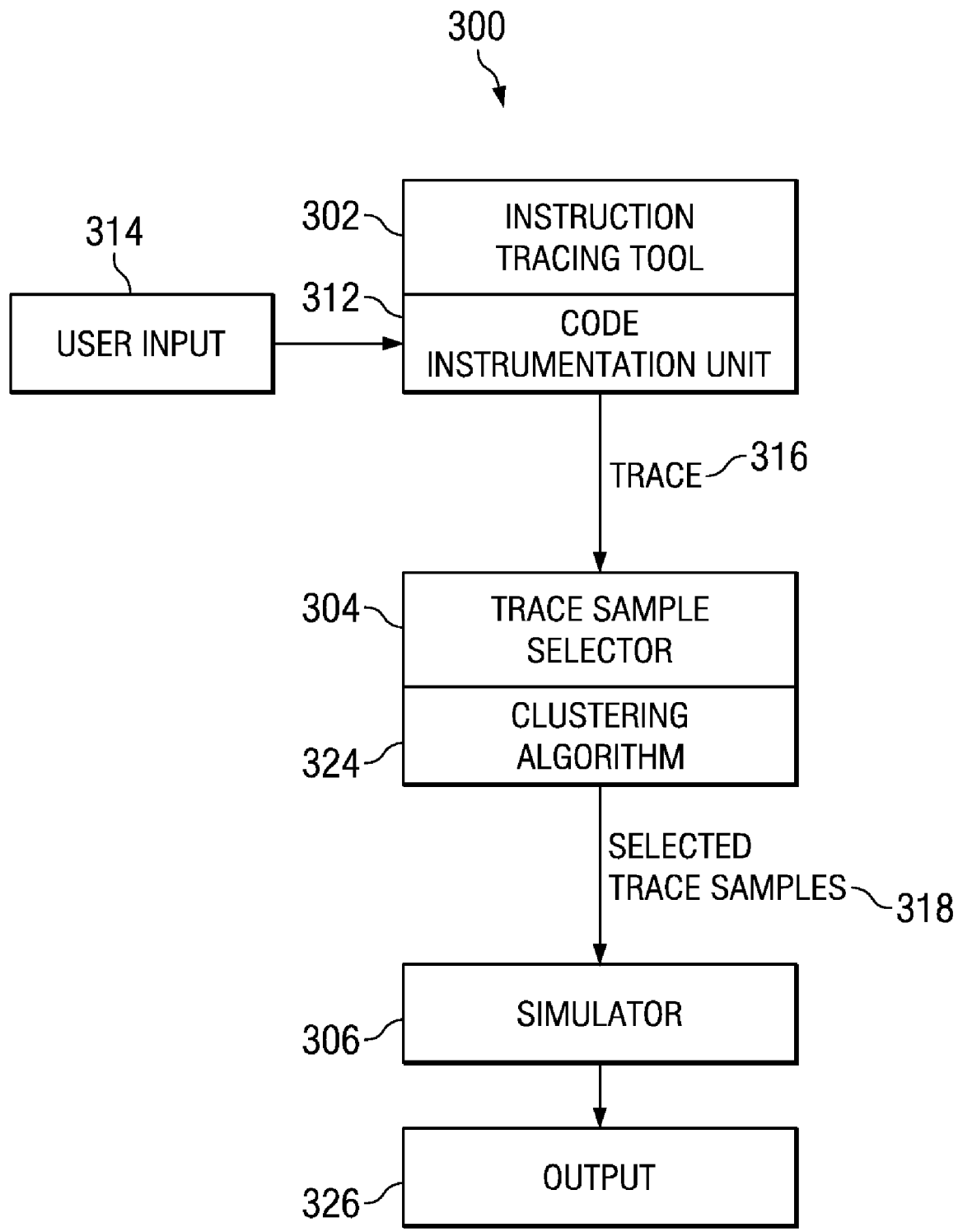
FIG. 3 is a block diagram that schematically depicts a system for simulating processor operation using a clustering-based trace sample selection mechanism according to an exemplary embodiment.

FIG. 3 is a block diagram that schematically depicts a system for simulating processor operation using a clustering-based trace sample selection mechanism according to an exemplary embodiment. The system is generally designated by reference number 300, and includes instruction tracing tool 302, trace sample selector 304 and simulator 306.

Instruction tracing tool 302 generates an instruction trace from which trace samples are to be selected for running a simulation of operation of a processor, such as processing unit 206 in data processing system 200 illustrated in FIG. 2. Instruction tracing tool 302 includes code instrumentation unit 312. As will be explained hereinafter, code instrumentation unit 312 allows a user to specify, via user input 314, interval boundaries to the instruction tracing tool. Using a set of markers, the user specifies "protected intervals" of code that are not to be mixed with other instructions. Each protected interval should correspond to a known phase or part of a phase. In addition, a user may specify other information regarding the intervals. For example, pieces of code that are not fully understood may be specified by simply not designating them as "protected intervals". This will allow those pieces of code to be split into intervals automatically (either fixed length intervals or automatically determined variable length intervals). In addition, a user is given the ability to specify regions of code that should not be traced at all, allowing the user to focus only on sections of code that are of interest (for example, if the user is interested only in tracing certain "hot spots" of code and not in creating a representative trace sample). In general, exemplary embodiments allow for more accurate phase analysis using SimPoint-style trace sample selection methods, and provide more representative trace samples for performance projections and design space explorations.

Trace sample selector 304 receives instruction trace 316 to which markers have been applied, and provides selected trace samples 318 for use by simulator 306. According to an exemplary embodiment, trace sample selector 304 divides the marked instruction trace into a plurality of intervals, taking into consideration the applied markers, forms the intervals into a plurality of clusters based on the code profile of each interval, and selects at least one interval from each cluster as a trace sample. The selected intervals should be of at least a minimum size, and in general, should be greater than about one percent of the total number of instructions in a trace.

According to an exemplary embodiment, trace sample selector 304 includes a SimPoint-type clustering algorithm 324 for performing the clustering operation, although it should be understood that this is intended to be exemplary only, as exemplary embodiments are not limited to being used with any particular clustering algorithm.

The selected trace samples are then used by simulator 306 to perform a simulation, and a result of the simulation is provided to a user via output 326, for example, a graphical user interface (GUI).

In accordance with an exemplary embodiment, code is instrumented with a set of markers that the user's instruction tracing tool will recognize. These markers are used to identify the beginning and end of "protected intervals" which are sections of dynamic execution that are not to be split into separate intervals. The set of markers include a start marker (S), an end marker (E), a break marker (B) and an end all marker (EA) and are identified as follows:

S (Start)
    Starts protected interval (or if already in a protected interval, continues protected interval)
    Pushes a "Start" on a "Start Stack"

E (End)
    Pops a "Start" from the "Start Stack"
    If a "Start Stack" is empty, ends protected interval and starts a new fixed-length interval
    Ignored if not in protected region
    Stack method allows nesting of protected regions (for example, if a user wants a particular function to be its own interval in some cases but part of a larger interval in other cases)

B (Break)
    Used to break a protected interval into multiple protected intervals—if interval is not protected, is ignored (allows same function to be partitioned in different ways depending on call path)
    Signals the end of a current interval and beginning of a new interval, maintains protection of new intervals (no "Starts" popped) EA (End All)
    Used to end a protected interval no matter how many "Starts" are on the stack (useful if user knows phase information of a function only up to a certain instruction, but doesn't have intimate knowledge of the remainder of the function)
    Pops all starts from "Start Stack", ends protected region and interval, begins new fixed length interval.

The use of the above markers is governed by the following syntax:
    Every "S" should have a matching "E" or "EA" in the same function, otherwise intervals may not be defined as the user intends if the function calls different functions in different instances (the reverse is not necessary, as excess E's and EA's will be ignored once "Start Stack" is empty)
    "B"s can be placed anywhere A user can insert the above markers into the code via a simple API (Application Program Interface) consisting of #define statements that insert undefined instructions into the code at appropriate places, which the user's instruction tracing tool would be able to recognize. For example:

```
#define  InsertMarkerS asm("\t.long\t0x00000001\n")
#define  InsertMarkerE asm("\t.long\t0x00000002\n")
```

```
#define  InsertMarkerB asm("\t.long\t0x00000003\n")
#define  InsertMarkerEA asm("\t.long\t0x00000004\n")
fA( )
{
insertMarkerS;
...
insertMarkerB;
...
insertMarkerE;
}
```

The instruction tracing tool, upon seeing "0x00000001" in the instruction stream, would know it had encountered an "S" marker and not an illegal instruction. Alternatively, the user could insert these long statements directly into an assembly file (if, for example, the user uses aggressive compiler optimizations that make correspondences between high-level language and actual code difficult to determine). The combination of these markers provides a flexible framework in which the user can control interval boundaries so that they are aligned with known phase boundaries.

The "S" and "E" markers are tracked using a stack—each "S" that is encountered in the instruction stream is placed on the stack and each "E" that is encountered removes one "S" (or in the case of "EA", all "S"s) from the stack. A non-empty stack indicates that the current trace interval is protected. This stack-based system allows all functions called between an "S" and an "E" to be a part of the protected interval, without the user having to separately instrument all of the functions called in the interval. This also allows code to be in a protected interval only when the user wants it to be, by allowing the user to instrument only the parent functions that he/she knows are part of a known phase and not child functions that are not always part of a known phase. One simple example of a function that is likely to be a child function in many different phases of a program is the rand( ) function. One might not want such an all-purpose function to always be in a protected interval.

Figure 4:
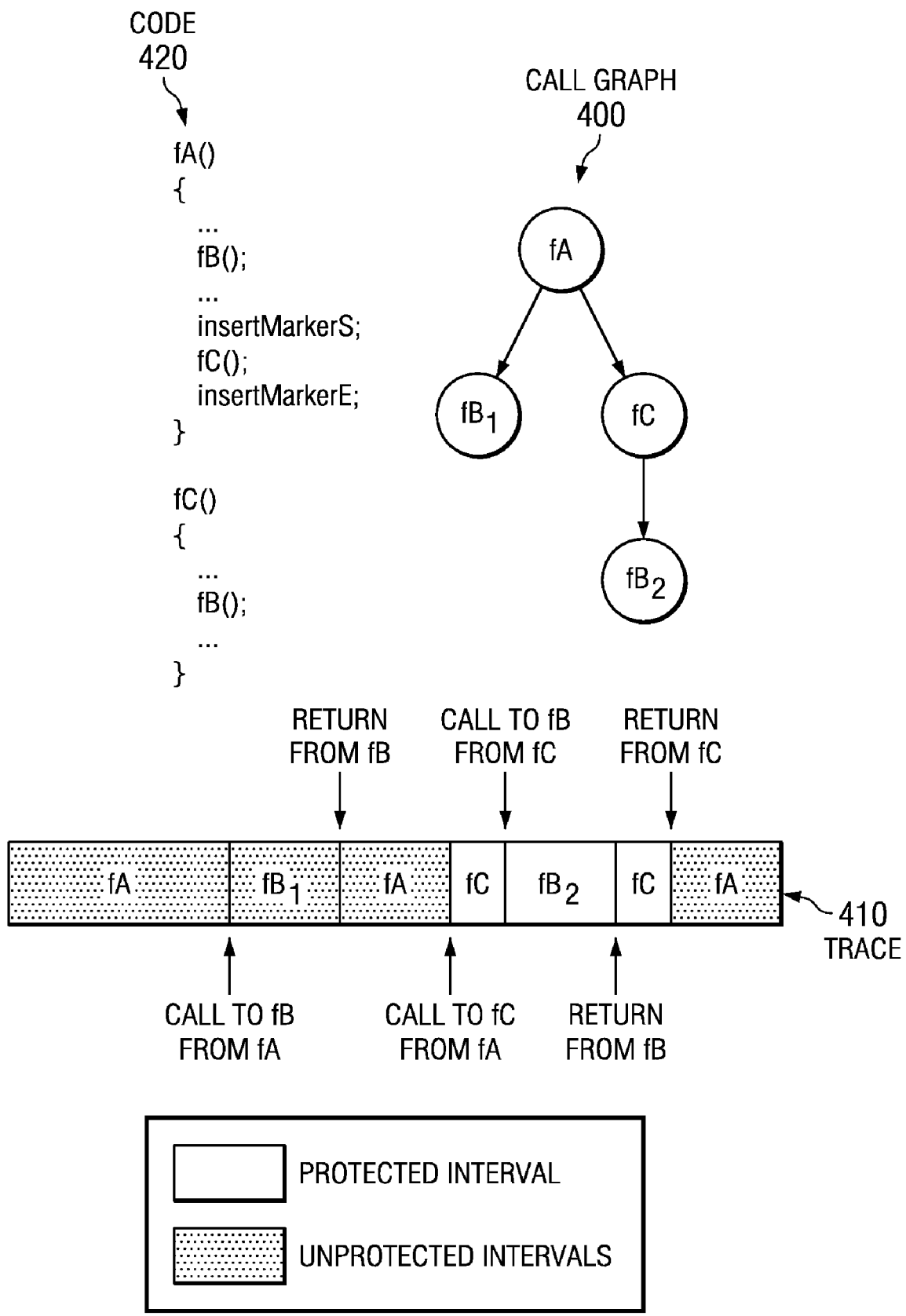
Figure 5:
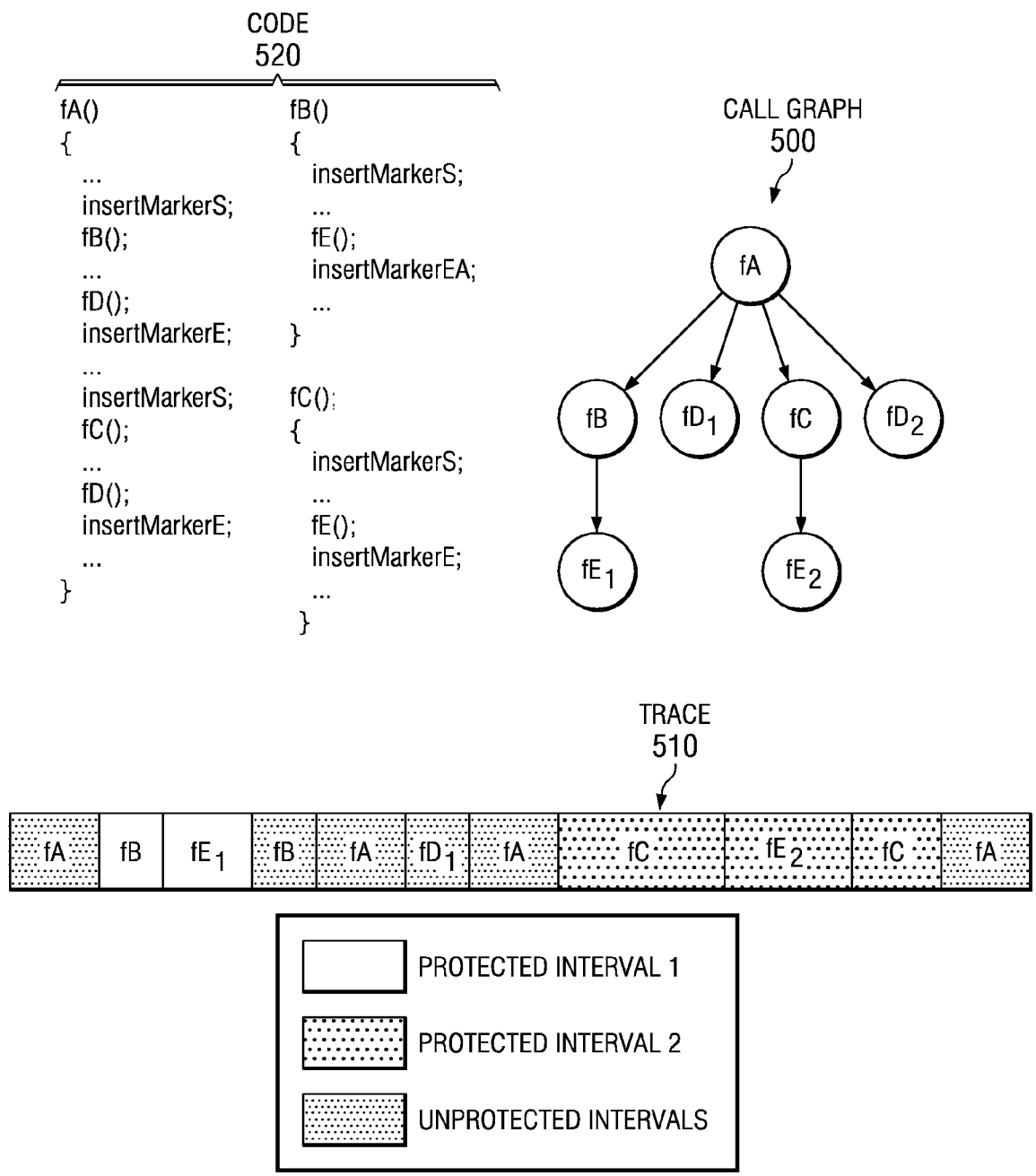

FIGS. 4, 5 and 6 are call graphs and traces that illustrate the manner in which placement of markers affects interval boundaries of a trace according to exemplary embodiments. Note that in FIGS. 4-6, unless otherwise specified, the vertical lines in the "Trace" diagrams represent calls to and returns from functions, not boundaries between intervals.

FIG. 4 illustrates a call graph 400 and a corresponding trace 410 of a section of code 420 illustrating an example of how functions called by protected code are also protected, and of the function (fB) that is part of a protected interval only when its parent function is protected. FIG. 5 illustrates a call graph 500 and corresponding trace 510 of code section 520 showing how the use of the EA marker affects the boundaries of protected intervals. FIG. 6 illustrates a call graph 600 and corresponding trace 610 of a section of code 620 showing how the use of the B marker affects the boundaries of protected intervals.

FIG. 7 is a flowchart that illustrates a method for simulating processor operation according to an exemplary embodiment. The method is generally designated by reference number 700, and may be implemented in simulation system 300 in FIG. 3. The method begins by generating an instruction trace having user input markers (Step 702). As indicated previously, this may be accomplished by a user instrumenting the source code of an application to be traced to reflect the user's knowledge of the application's phase behavior. The marked instruction trace is then divided into intervals taking into consideration the markings (Step 704). Basic Block Vectors (BBVs) are then created for each interval (Step 706), and the BBVs are output to a file that clustering software can read (Step 708). Clustering software, for example, a SimPoint-style clustering algorithm then clusters the BBVs (Step 710). The clusters are then processed to select the best set of intervals within a 100M instruction budget (Step 712). The selected intervals should be of at least a minimum size, and in general, should be greater than about one percent of the total number of instructions in a trace.

The selected intervals are then used as highly representative trace samples to perform a simulation (Step 714), results of the simulation are output (Step 716), and the method ends.

Figure 8A:
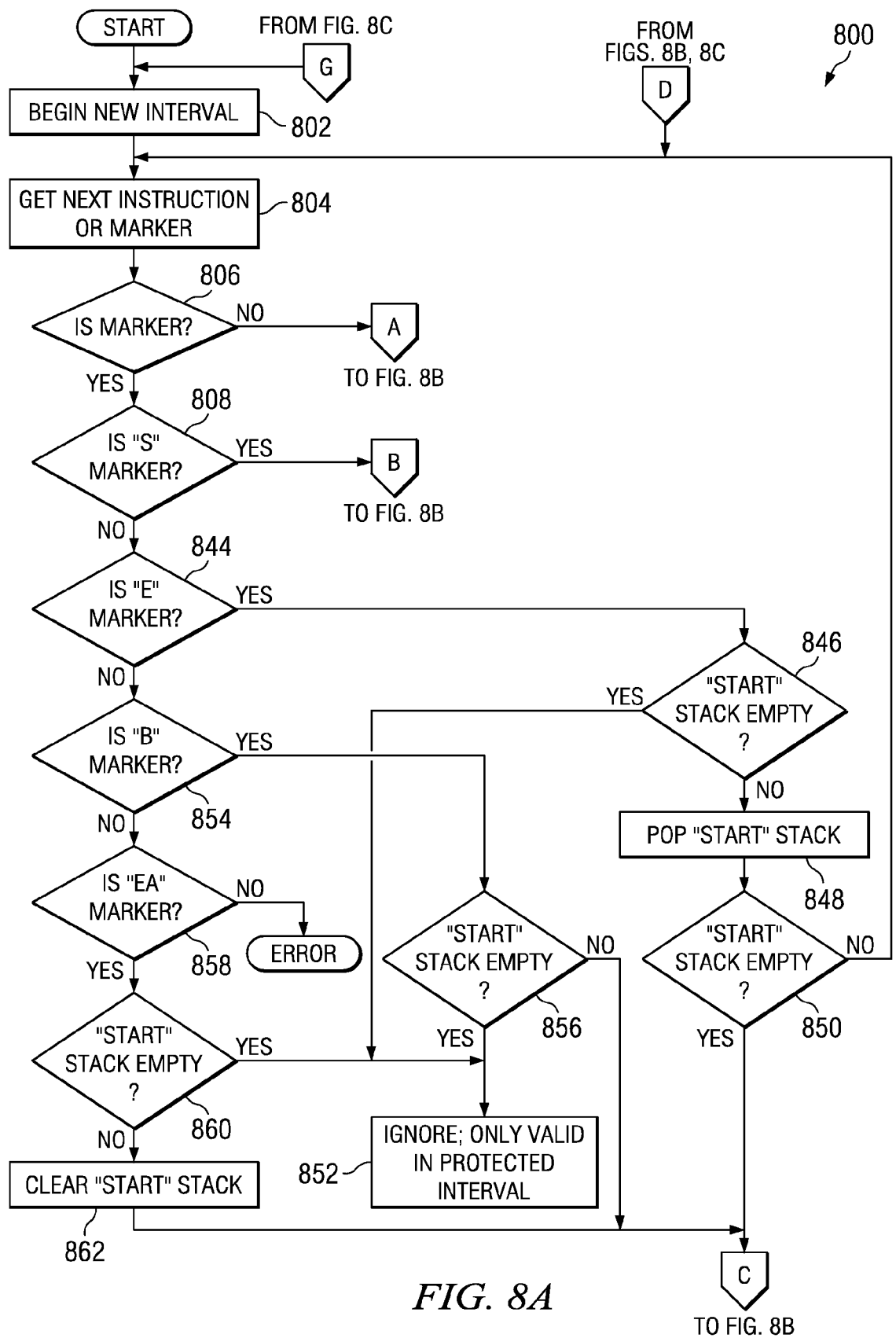
FIGS. 8A, 8B and 8C together are a flowchart that illustrates a method for creating trace intervals for use by a clustering algorithm in selecting trace samples for use in simulating processor operation according to an exemplary embodiment.
Figure 8B:
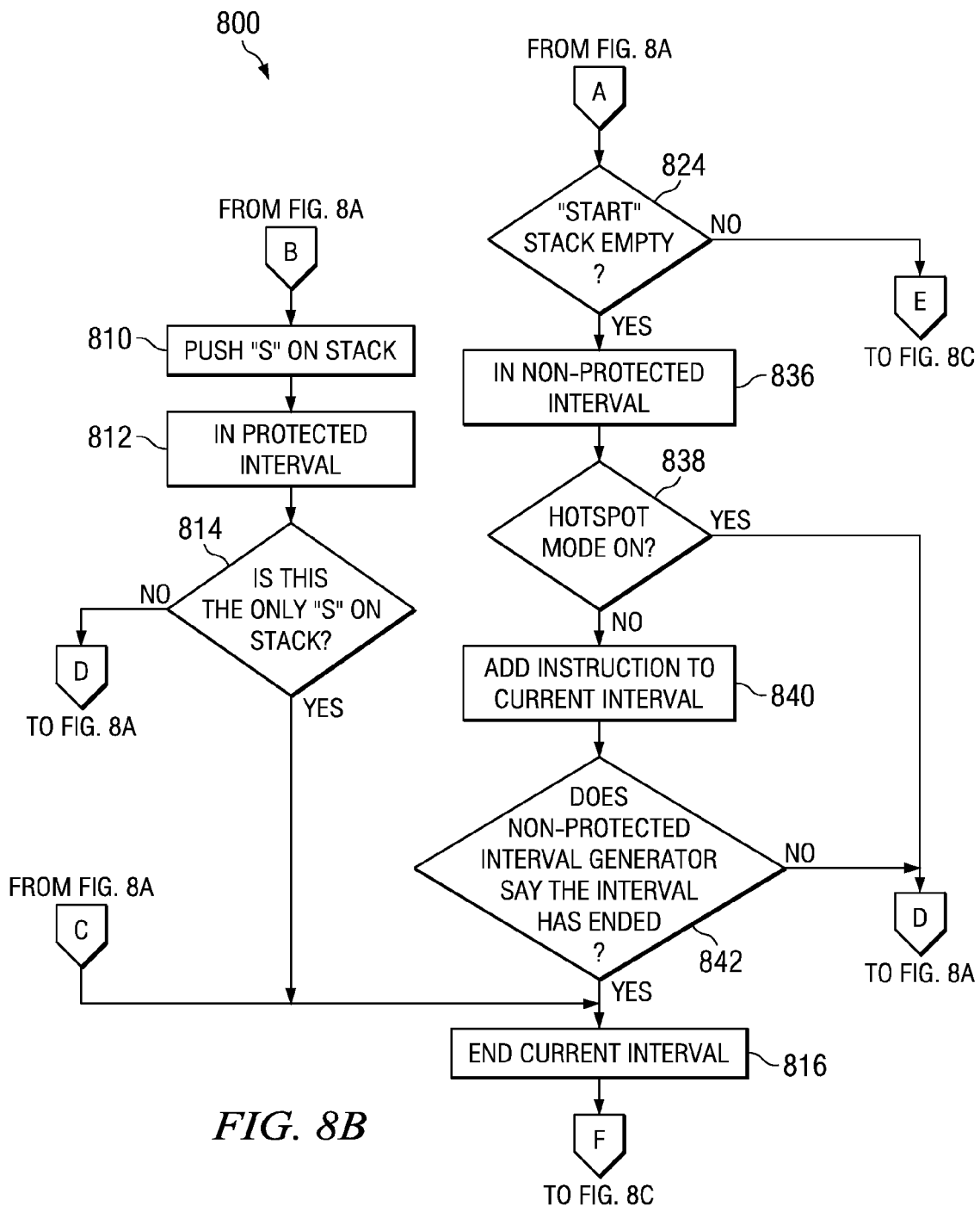
Figure 8C:
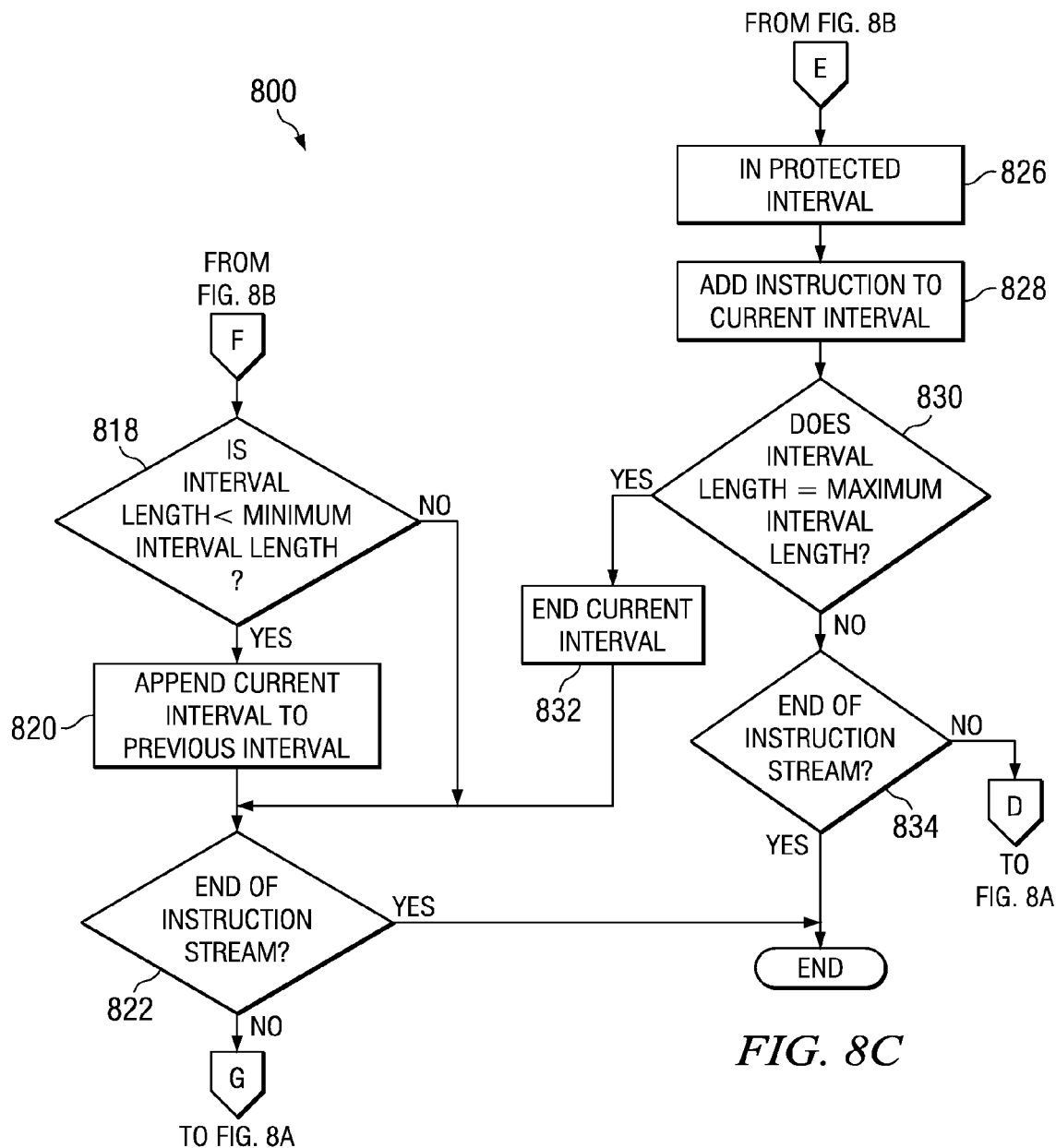

FIGS. 8A, 8B and 8C show a flowchart that illustrates a method for creating trace intervals for use by a clustering algorithm in selecting trace samples for use in simulating processor operation according to an exemplary embodiment. The method is generally designated by reference number 800, and may be implemented as Step 704 in FIG. 7. In particular, FIGS. 8A, 8B and 8C illustrate an algorithm that an instruction tracing tool would use to process markers and create intervals for consumption by a SimPoint-style clustering algorithm. It should be understood, however, that this is intended to be exemplary only as exemplary embodiments are not limited to any particular tracing tool or any particular clustering algorithm.

The method starts at the beginning of a new interval (Step 802). The next instruction or marker is obtained (Step 804). A determination is made whether what has been obtained is a marker (Step 806). If it is a marker (Yes output of Step 806), a determination is made whether it is an "S" marker (Step 808).

If the marker is an "S" marker (Yes output of Step 808), the "S" marker is pushed on the stack (Step 810) resulting in that the instruction enters into a protected interval (Step 812). A determination is then made whether the "S" marker is the only "S" marker on the stack (Step 814). If it is determined that the "S" marker is not the only "S" marker on the stack (No output of Step 814), the method returns to Step 804 to get the next instruction or marker. If it is determined that the "S" marker is the only "S" marker on the stack (Yes output of Step 814), the current protected interval ends (Step 816).

A determination is then made whether the length of the protected interval that just ended is less than a minimum interval length (Step 818). If the length is less than the minimum interval length (Yes output of Step 818), the current interval is appended to the previous interval (Step 820), and a determination is made if it is the end of the instruction stream (Step 822). If the length of the protected interval that just ended is not less than the minimum interval length (No output of Step 818), a determination is made if it is the end of the instruction stream (Step 822).

If it is determined that it is the end of the instruction stream (Yes output of Step 822), the method ends. If it is determined that it is not the end of the instruction stream (No output of Step 822), the method returns to Step 802 to begin a new interval.

Returning to Step 806, if it is determined that the instruction or marker is not a marker (No output of Step 806), a determination is made whether the Start Stack is empty (Step 824). If it is determined that the Start Stack is not empty (No output of Step 824), the instruction enters in a protected interval (Step 826), and the instruction is added to the current interval (Step 828). A determination is then made whether the interval length equals a maximum interval length (Step 830). If it is determined that the interval length equals the maximum interval length (Yes output of Step 830), the current interval is ended (Step 832), and the method goes to Step 822 where it is determined whether it is the end of the instruction stream (Step 822).

If it is determined that the interval length does not equal the maximum interval length (No output of Step 830), it is determined whether it is the end of the instruction stream (Step 834). If it is determined not to be the end of the instruction stream (No output of Step 834), the method returns to Step 804 to get the next instruction or marker. If it is determined to be the end of the instruction stream (Yes output of Step 834), the method ends.

Returning to Step 824, if it is determined that the start stack is empty (Yes output of Step 824); the instruction enters in a non-protected interval (Step 836). A determination is then made whether the Hotspot mode is on (Step 838). If the Hotspot mode is not on (No output of Step 838), the instruction is added to the current interval (Step 840), and it is determined whether the non-protected interval generator says the interval has ended (Step 842). If it is determined that the non-protected interval generator says the interval has ended (Yes output of Step 842), the current interval is ended (Step 816). If it is determined that the non-protected interval generator says the interval has not ended (No output of Step 842), the method returns to Step 804 to get the next instruction or marker.

Returning to Step 808, if the marker is determined not to be an "S" marker (No output of Step 808), a determination is made whether the marker is an "E" marker (Step 844). If the marker is determined to be an "E" marker (Yes output of Step 844), a determination is made whether the Start Stack is empty (Step 846). If the Start Stack is determined not to be empty (No output of Step 846), the Start Stack is popped (Step 848), and it is again determined whether the Start Stack is empty (Step 850). If the Start Stack is now determined to be empty (Yes output of Step 850), the current interval is ended (Step 816). If the Start Stack is determined not to be empty (No output of Step 850), the method returns to Step 804 to get the next instruction or marker.

Returning to Step 846, if it is determined that the Start Stack is empty (Yes output of Step 846); the "E" marker is ignored as it is only valid in a protected interval (Step 852).

Returning to Step 844, if it is determined that the marker is not an "E" marker (No output of Step 844); a determination is made whether the marker is a "B" marker (Step 854). If the marker is determined to be a "B" marker (Yes output of Step 854), a determination is made whether the Start Stack is empty (Step 856). If it is determined that the Start Stack is empty (Yes output of Step 856), the B marker is ignored as it is only valid in a protected interval (Step 852). If the Start Stack is not empty (No output of Step 856), the current interval is ended (Step 816).

Returning to Step 854, if it is determined that the marker is not a "B" marker (No output of Step 854); a determination is made whether the marker is an "EA" marker (Step 858). If the marker is determined to be an "EA" marker (Yes output of Step 858), a determination is made whether the Start Stack is empty (Step 860). If the Start Stack is determined to be empty (Yes output of Step 860), the marker is ignored as only being valid in a protected interval (Step 852). If the Start Stack is determined not to be empty (No output of Step 860), the Start Stack is cleared (Step 862), and the current interval is ended (Step 816).

Returning to Step 858, if the marker is determined not to be an "EA" marker (No output of Step 858); an error is indicated.

It should be noted that the algorithm illustrated in FIGS. 8A, 8B and 8C requires a user to specify a minimum and maximum length for protected intervals. This is useful because an intelligent user may have imperfect information of phase behavior. For example, the user may know a certain region of code has certain stable performance characteristics and should be considered a phase, but may not know how many dynamic instructions are in the phase. A protected interval that is much shorter or much longer than the rest of the intervals in the trace may result in suboptimal clustering.

For example, an interval that is too short presents problems because intervals typically need to be at least 1M instructions long to amortize cold-start misses (cache misses that occur when caches have not been warmed, which is a problem encountered with any trace sample, since the non-sampled instructions preceding the beginning of the sample will not have been executed). Also SimPoint weights intervals by length so an interval that is much smaller than other intervals in the trace will likely not be selected for sampling, and there is, therefore, no reason to keep it as a separate interval.

An interval that is very long (more than 10M instructions) probably consists of more than one phase and should be broken into several intervals to allow the clustering algorithm to find any phases that may exist in it. Also, in the simulation methodology, trace samples of 100M instructions total length or less must be used, since the cycle-accurate model can only run up to 100M instructions overnight. Putting a cap on interval length ensures that one interval will not take up too much of the 100M instruction budget, which would prevent other phases of the trace from being fairly represented in the sample.

If an interval is below the minimum length, it is appended to the previous interval under the assumption that it is too small to be significant to the code profile of the interval. This could happen with protected or non-protected intervals. If an interval reaches the maximum length, a new interval is begun. This happens only with protected intervals and does not affect the protected status of the new interval. The effect is equivalent to that of a "B" marker.

The software tracing tool also allows a user to turn on a "Hotspot" mode in which only protected intervals would be traced. This capability is useful for users who only want to sample code that is a performance bottleneck or is otherwise interesting enough to observe in isolation from the rest of the trace.

The flow illustrated in FIGS. 8A, 8B and 8C is simple to implement. The software tracing tool is already used to build a driver that outputs the address and length of each basic block executed, and also to indicate when an interval has begun and ended. The logic in the flow is added to that driver to create the desired intervals. Another tool takes this information and creates BBVs for each query, outputting them to a file that SimPoint software can read. The SimPoint software clusters the BBVs. The clusters are then processed to find the best set of intervals within the 100M instruction budget.

Exemplary embodiments thus provide a computer implemented method, system and computer usable program code for simulating processor operation in a data processing system. An instruction trace is generated, wherein the instruction trace includes markers specified by a user for identifying interval boundaries for at least one interval of the instruction trace. The instruction trace is divided into a plurality of intervals in consideration of the markers, and the plurality of intervals are formed into a plurality of interval clusters, wherein each interval cluster represents one phase of execution of the instruction trace. At least one interval from each of the plurality of interval clusters is selected as a trace sample to provide a plurality of trace samples, wherein each selected interval is of at least a minimum size, a simulation is performed using the plurality of trace samples, and a result of the simulation is provided to the user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for simulating processor operation in a data processing system, the computer implemented method comprising:
    generating an instruction trace of code that includes phases of execution of the code that are known to a user and phases of execution of the code that are unknown to the user;
    wherein the code includes markers inserted into the code by the user in order to specify protected intervals, and further wherein each one of the protected intervals corresponds to one of the phases that are known to the user, and still further wherein boundaries of each one of the protected intervals are aligned with boundaries of each one of the phases that are known to the user, and wherein a first part of the instruction trace includes only user-specified protected intervals and a second part of the instruction trace corresponds to phases of execution of the code that are unknown to the user;

wherein the markers include a plurality of start markers, wherein each one of the plurality of start markers indicates a beginning of a different one of the protected intervals, an end marker that indicates an end of a particular one of the protected intervals, a break marker that is insertable between a selected one of the plurality of start markers and the end marker to break the particular one of the protected intervals into a plurality of particular protected intervals, and an end all marker;

in response to encountering each one of the plurality of start markers in the code, pushing each one of the plurality of start markers onto a stack causing each one of the plurality of start markers to enter into one of the protected intervals;

in response to encountering the end marker in the code, popping one of the plurality of start markers from the stack;

in response to encountering the end all marker in the code, popping all of the plurality of start markers from the stack; and dividing, by a clustering-based algorithm, only the second part of the instruction trace into a plurality of intervals, wherein the cluster-based algorithm does not divide the first part of the instruction trace into intervals further comprising:

forming at least one of the plurality of intervals and at least one of the protected intervals into a plurality of interval clusters, wherein each one of the plurality of interval clusters represent one phase of execution of the instruction trace;

selecting at least one selected interval from each one of the plurality of interval clusters to form a trace sample, wherein each at least one selected interval is of at least a minimum size; performing a simulation using the trace sample plurality of trace samples; and providing the user a result of the simulation; and wherein the minimum size of each at least one selected interval is greater than one percent of a total number of instructions in the instruction trace.

2. The computer implemented method of claim 1, wherein the markers comprise at least one marker that specifies a region of code that will not be traced.

3. The computer implemented method of claim 1, and further comprising:

receiving a user specified minimum length and a user specified maximum length for each one of the protected intervals.

4. The computer implemented method of claim 3, and further comprising:

in response to determining that a particular length for a second particular one of the protected intervals is less than the user specified maximum length, appending the second particular one of the protected intervals to a third particular one of the protected intervals, wherein the third particular one of the protected intervals is previous to the second particular one of the protected intervals.

5. The computer implemented method of claim 3, and further comprising:

in response to determining that a particular length for a second particular one of the protected intervals being equal to the user specified maximum length, ending the second one of the particular one of the protected intervals.

6. The computer implemented method according to claim 1, further comprising:

determining whether only one of the plurality of start markers has been pushed onto the stack; and in response to determining that only one of the plurality of start markers has been pushed onto the stack, ending a current one of the protected intervals.

7. The computer implemented method of claim 1, further comprising:

beginning an evaluation of the code;

obtaining a next instruction or a next one of the markers in the code;

determining whether the next instruction or the next one of the markers was obtained;

in response to obtaining the next instruction instead of the next one of the markers, determining whether the stack is empty; and in response to determining that the stack not empty, adding the instruction to a current one of the protected intervals.

8. A computer program product stored in a computer usable non-transitory medium having computer usable program code stored therein and configured for simulating processor operation in a data processing system, the computer program product comprising:

computer usable program code configured for generating an instruction trace of code that includes phases of execution of the code that are known to a user and phases of execution of the code that are unknown to the user;

wherein the code includes markers inserted into the code by the user in order to specify protected intervals, and further wherein each one of the protected intervals corresponds to one of the phases that are known to the user, and still further wherein boundaries of each one of the protected intervals are aligned with boundaries of each one of the phases that are known to the user, and wherein a first part of the instruction trace includes only user-specified protected intervals and a second part of the instruction trace corresponds to phases of execution of the code that are unknown to the user;

wherein the markers include a plurality of start markers, wherein each one of the plurality of start markers indicates a beginning of a different one of the protected intervals, an end marker that indicates an end of a particular one of the protected intervals, a break marker that is insertable between a selected one of the plurality of start markers and the end marker to break the particular one of the protected intervals into a plurality of particular protected intervals, and an end all marker;

in response to encountering each one of the plurality of start markers in the code, computer usable program code configured for pushing each one of the plurality of start markers onto a stack causing each one of the plurality of start markers to enter into one of the protected intervals;

in response to encountering the end marker in the code, computer usable program code configured for popping one of the plurality of start markers from the stack;

in response to encountering the end all marker in the code, computer usable program code configured for popping all of the plurality of start markers from the stack; and computer usable program code configured for dividing, by a clustering-based algorithm, only the second part of the instruction trace into a plurality of intervals, wherein the cluster-based algorithm does not divide the first part of the instruction trace into intervals further comprising:

computer usable program code configured for forming at least one of the plurality of intervals and at least one of the protected intervals into a plurality of interval clusters, wherein each one of the plurality of interval clusters represent one phase of execution of the instruction trace;

computer usable program code configured for selecting at least one selected interval from the plurality of intervals and the protected intervals as a trace sample to provide a plurality of trace samples, wherein each at least one selected interval is of at least a minimum size;

computer usable program code configured for performing a simulation using the plurality of trace samples;

computer usable program code configured for providing the user a result of the simulation; and wherein the minimum size of each at least one selected interval is greater than one percent of a total number of instructions in the instruction trace.

9. The computer program product of claim 8, wherein the markers further comprise a marker that specifies a region of code that will not be traced.

10. The computer program product of claim 8, and further comprising:

computer usable program code configured for receiving a user specified minimum length and a user specified maximum length for each one of the protected intervals.

11. The computer program product of claim 10, and further comprising:

in response to determining that a particular length for a second particular one of the protected intervals is less than the user specified maximum length, computer usable program code configured for appending the second particular one of the protected intervals to a third particular one of the protected intervals, wherein the third particular one of the protected intervals is previous to the second particular one of the protected intervals.

12. The computer program product of claim 10, and further comprising:

in response to determining that a particular length for a second particular one of the protected intervals being equal to the user specified maximum length, computer usable program code configured for ending the second one of the particular one of the protected intervals.

13. The computer program product of claim 8, further comprising:

computer usable program code configured for determining whether only one of the plurality of start markers has been pushed onto the stack; and in response to determining that only one of the plurality of start markers has been pushed onto the stack, computer usable program code for ending a current one of the protected intervals.

14. The computer program product of claim 8, further comprising:

computer usable program code configured for beginning an evaluation of the code;

computer usable program code configured for obtaining a next instruction or a next one of the markers in the code;

computer usable program code configured for determining whether the next instruction or the next one of the markers was obtained;

in response to obtaining the next instruction instead of the next one of the markers, computer usable program code configured for determining whether the stack is empty; and in response to determining that the stack not empty, computer usable program code configured for adding the instruction to a current one of the protected intervals.

15. A simulator system for simulating a first processor's operation in a data processing system, comprising:

a development processor executing a tracing tool for generating an instruction trace of code that includes phases of execution of the code that are known to a user and phases of execution of the code that are unknown to the user;

wherein the code includes markers inserted into the code by the user in order to specify protected intervals, and further wherein each one of the protected intervals corresponds to one of the phases that are known to the user, and still further wherein boundaries of each one of the protected intervals are aligned with boundaries of each one of the phases that are known to the user, and wherein a first part of the instruction trace includes only user-specified protected intervals and a second part of the instruction trace corresponds to phases of execution of the code that are unknown to the user;

wherein the markers include a plurality of start markers, wherein each one of the plurality of start markers indicates a beginning of a different one of the protected intervals, an end marker that indicates an end of a particular one of the protected intervals, a break marker that is insertable between a selected one of the plurality of start markers and the end marker to break the particular one of the protected intervals into a plurality of particular protected intervals, and an end all marker;

in response to encountering each one of the plurality of start markers in the code, a trace evaluation mechanism for pushing each one of the plurality of start markers onto a stack causing each one of the plurality of start markers to enter into one of the protected intervals;

in response to encountering the end marker in the code, the trace evaluation mechanism for popping one of the plurality of start markers from the stack;

in response to encountering the end all marker in the code, the trace evaluation mechanism for popping all of the plurality of start markers from the stack; and a trace sample selector for receiving the instruction trace, the trace sample selector comprising:

a divider for dividing, by a clustering-based algorithm, only the second part of the instruction trace into a plurality of intervals, wherein the cluster-based algorithm does not divide the first part of the instruction trace into intervals further comprising:

an interval forming mechanism for forming at least one of the plurality of intervals and at least one of the protected intervals into a plurality of interval clusters, wherein each one of the plurality of interval clusters represent one phase of execution of the instruction trace;

selecting at least one selected interval from each one of the plurality of interval clusters to form a trace sample, wherein each at least one selected interval is of at least a minimum size;

a simulator for forming a simulation using the trace sample plurality of trace samples; an output for providing the user a result of the simulation; and wherein the minimum size of each at least one selected interval is greater than one percent of a total number of instructions in the instruction trace.

16. The simulator system of claim 15, wherein the markers further comprise a marker that specifies a region of code that will not be traced.

17. The simulator system according to claim 15, further comprising:
- the trace evaluation mechanism for beginning an evaluation of the code;
- the trace evaluation mechanism for determining whether only one of the plurality of start markers has been pushed onto the stack;
- in response to determining that only one of the plurality of start markers has been pushed onto the stack, the trace evaluation mechanism for ending a current one of the protected intervals;
- the trace evaluation mechanism for receiving a user specified minimum length and a user specified maximum length for each one of the protected intervals;
- in response to determining that a particular length for a second particular one of the protected intervals is less than the user specified maximum length, the trace evaluation mechanism for appending the second particular one of the protected intervals to a third particular one of the protected intervals, wherein the third particular one of the protected intervals is previous to the second particular one of the protected intervals;
- in response to determining that a particular length for a second particular one of the protected intervals being equal to the user specified maximum length, the trace evaluation mechanism for ending the second one of the particular one of the protected intervals;
- the trace evaluation mechanism for obtaining a next instruction or a next one of the markers in the code;
- the trace evaluation mechanism for determining whether the next instruction or the next one of the markers was obtained;
- in response to obtaining the next instruction instead of the next one of the markers, the trace evaluation mechanism for determining whether the stack is empty; and
- in response to determining that the stack not empty, the trace evaluation mechanism for adding the instruction to a current one of the protected intervals.

* * * * *